United States Patent
Izak et al.

(10) Patent No.: US 11,865,891 B2
(45) Date of Patent: Jan. 9, 2024

(54) METHOD AND SYSTEM FOR ACTIVE ROLL CONTROL

(71) Applicant: GM GLOBAL TECHNOLOGY OPERATIONS LLC, Detroit, MI (US)

(72) Inventors: Robert G. Izak, Dryden, MI (US); Nojan Medinei, Toronto (CA); Larry G. Gepfrey, Fenton, MI (US); Bo Yu, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 398 days.

(21) Appl. No.: 17/085,637

(22) Filed: Oct. 30, 2020

(65) Prior Publication Data
US 2022/0134835 A1 May 5, 2022

(51) Int. Cl.
*B60G 21/055* (2006.01)

(52) U.S. Cl.
CPC .... *B60G 21/0553* (2013.01); *B60G 2400/104* (2013.01); *B60G 2400/204* (2013.01); *B60G 2400/25* (2013.01); *B60G 2400/40* (2013.01); *B60G 2400/80* (2013.01)

(58) Field of Classification Search
CPC ........... B60G 2400/25; B60G 2400/40; B60G 2400/80; B60G 2400/104; B60G 2400/204; B60G 2600/182
See application file for complete search history.

(56) References Cited

U.S. PATENT DOCUMENTS

| | | | |
|---|---|---|---|
| 2005/0131604 A1* | 6/2005 | Lu | B60W 30/04 701/38 |
| 2007/0182110 A1* | 8/2007 | Urababa | B60G 21/0555 280/5.506 |
| 2008/0215210 A1 | 9/2008 | Bulteau | |
| 2009/0112400 A1* | 4/2009 | Urababa | B60G 21/0555 701/38 |
| 2009/0224493 A1* | 9/2009 | Buma | B60G 17/0162 280/5.511 |
| 2010/0318262 A1* | 12/2010 | Mizuta | B60G 21/0558 701/38 |

(Continued)

FOREIGN PATENT DOCUMENTS

| | | |
|---|---|---|
| CN | 1922043 A | 2/2007 |
| CN | 101405155 A | 4/2009 |

(Continued)

*Primary Examiner* — Anshul Sood
(74) *Attorney, Agent, or Firm* — Quinn IP Law

(57) ABSTRACT

A system for active roll control for a vehicle body is provided and includes a sensor operable to monitor a tilt of the body and a suspension system. The suspension system includes an active sway bar including a first bar portion, a second bar portion, and an active roll control motor disposed between the first bar portion and the second bar portion. The active roll control motor is operable to turn the first bar portion in relation to the second bar portion. The system further includes a computerized active roll control controller which is operative to monitor a driving mode including one of straight-line driving and rounding a curve on a road, monitor an output of the sensor, determine a desired roll moment based upon the driving mode and the output of the sensor, and control the active roll control motor based upon the desired roll moment.

12 Claims, 7 Drawing Sheets

(56) References Cited

U.S. PATENT DOCUMENTS

2018/0272829 A1\* 9/2018 Sim .................... B60G 21/0555
2018/0281547 A1\* 10/2018 Koumura ............. B60G 17/018

FOREIGN PATENT DOCUMENTS

| CN | 102490566 A | 11/2011 | |
|----|-------------|---------|---|
| CN | 103158474 A | 8/2012 | |
| CN | 106627026 A | 12/2016 | |
| CN | 108146183 A | 2/2018 | |
| CN | 108725126 A | 3/2018 | |
| CN | 108891410 A | 4/2018 | |
| CN | 111284287 A | 6/2019 | |
| WO | WO-2010122418 A1 \* | 10/2010 | ......... B60G 17/0162 |

\* cited by examiner

METHOD AND SYSTEM FOR ACTIVE ROLL CONTROL

INTRODUCTION

The disclosure generally relates to a method and system for active roll control.

Vehicles include suspension systems that are useful to cushion a vehicle from rough features upon a roadway. Suspensions include shock devices which include an internal spring and damper mechanism to filter out bumps or unsteadiness from the vehicle. Vehicle suspension systems may be electronically adjusted, for example, with stiffness or other properties of the suspension system being adjusted for qualities such as ride quality or smoothness and performance.

SUMMARY

A system for active roll control is provided. The system includes two wheels including a left wheel and a right wheel, a vehicle body of a vehicle, a sensor operable to monitor a tilt of the vehicle body, a vehicle suspension system operable to support the vehicle body above the two wheels. The vehicle suspension system includes an active sway bar operable to transmit a force from a first side of the vehicle suspension system to a second side of the vehicle suspension system in order to provide control over the tilt of the vehicle body. The active sway bar includes a first bar portion, a second bar portion, and an active roll control motor disposed between the first bar portion and the second bar portion. The active roll control motor is operable to turn the first bar portion in relation to the second bar portion. The system further includes a computerized active roll control controller which is operative to monitor a driving mode including one of straight-line driving and rounding a curve on a road, monitor an output of the sensor, determine a desired roll moment based upon the driving mode and the output of the sensor, and control the active roll control motor based upon the desired roll moment.

In some embodiments, the driving mode includes the straight-line driving, controlling the active roll control motor includes turning the first bar portion in relation to the second bar portion to optimize and control body roll accelerations that result from side-to-side road surface irregularities.

In some embodiments, when the driving mode includes rounding the curve of the road, controlling the active roll control motor includes turning the first bar portion in relation to the second bar portion to increase the force transmitted and cause the tilt of the vehicle body to lessen with respect to a ground surface.

In some embodiments, determining the desired roll moment based upon the driving mode includes blending a desired roll moment prioritizing ride quality and a desired roll moment prioritizing handling of the vehicle.

In some embodiments, blending the desired roll moment prioritizing the ride quality and the desired roll moment prioritizing the handling of the vehicle is based on a vehicle speed, a vehicle lateral acceleration, yaw rate, and a steering wheel input.

In some embodiments, determining the desired roll moment includes determining a total roll moment for the vehicle body.

In some embodiments, determining the total roll moment for the body includes utilizing a feed forward roll moment determination and a feedback roll moment determination.

According to an alternative embodiment, a system for active roll control is provided. The system includes four wheels, including two front wheels and two rear wheels, a vehicle body of a vehicle, and a sensor operable to monitor a tilt of the vehicle body. The system further includes a vehicle suspension system operable to support the vehicle body above the front wheels and the rear wheels. The vehicle suspension system includes a first active sway bar corresponding to the front two wheels operable to transmit a force from a first side of the vehicle suspension system to a second side of the vehicle suspension system in order to provide control over the tilt of the vehicle body. The first active sway bar includes a first bar portion, a second bar portion, and a first active roll control motor disposed between the first bar portion and the second bar portion. The first active roll control motor is operable to turn the first bar portion in relation to the second bar portion. The vehicle suspension system further includes a second active sway bar corresponding to the rear two wheels operable to transmit a force from the first side of the vehicle suspension system to the second side of the vehicle suspension system in order to provide control over the tilt of the vehicle body. The second active sway bar includes a third bar portion, a fourth bar portion, and a second active roll control motor disposed between the third bar portion and the fourth bar portion. The second active roll control motor is operable to turn the third bar portion in relation to the fourth bar portion. The system further includes a computerized active roll control controller operative to monitor a driving mode including one of straight-line driving and rounding a curve on a road and monitor an output of the sensor. The computerized active roll control controller is further operative to determine a first desired roll moment for first active roll control motor based upon the driving mode and the output of the sensor and determine a second desired roll moment for second active roll control motor based upon the driving mode and the output of the sensor. The computerized active roll control controller is further operative to control the first active roll control motor based upon the first desired roll moment and control the second active roll control motor based upon the second desired roll moment.

In some embodiments, when the driving mode includes straight-line driving, controlling the first active roll control motor includes turning the first bar portion in relation to the second bar portion to optimize and control body roll accelerations that result from side-to-side road surface irregularities. In some embodiments, when the driving mode includes the straight-line driving, controlling the second active roll control motor includes turning the third bar in relation to the fourth bar portion to optimize and control the body roll accelerations that result from the side-to-side road surface irregularities.

In some embodiments, when the driving mode includes rounding the curve of the road, controlling the first active roll control motor includes turning the first bar portion in relation to the second bar portion to increase the force transmitted and cause the tilt of the vehicle body to lessen with respect to a ground surface. In some embodiments, when the driving mode includes the rounding the curve of the road, controlling the second active roll control motor includes turning the third bar portion in relation to the fourth bar portion to increase the force transmitted and cause the tilt of the vehicle body to lessen with respect to the ground surface.

In some embodiments, determining the first desired roll moment based upon the driving mode includes blending a desired roll moment prioritizing ride quality and a desired roll moment prioritizing handling of the vehicle.

In some embodiments, determining the first desired roll moment and the second desired roll moment includes determining a total roll moment for the vehicle body.

In some embodiments, determining the total roll moment for the body includes utilizing a feed forward roll moment determination and a feedback roll moment determination.

In some embodiments, the computerized active roll control controller is further operative to estimate a distance between a center of gravity of the vehicle body and a roll center of the vehicle body based upon the desired roll moment. In some embodiments, the distance between the center of gravity of the vehicle body and the roll center of the vehicle body is used to improve a future iteration of determining the total roll moment for the vehicle body.

According to an alternative embodiment, a method for active roll control is provided. The method includes, within a computerized processor within a vehicle, monitoring a driving mode including one of straight-line driving and rounding a curve on a road, monitoring an output of a sensor operable to monitor a tilt of a vehicle body of the vehicle, and determining a desired roll moment based upon the driving mode and the output of the sensor. The method further includes, within the computerized processor, controlling an active roll control motor of an active sway bar of a vehicle suspension system based upon the desired roll moment. The active sway bar is operable to transmit a force from a first side of the vehicle suspension system to a second side of the vehicle suspension system in order to provide control over the tilt of the vehicle body.

In some embodiments, when the driving mode includes straight-line driving, controlling the active roll control motor includes turning a first bar portion of the active sway bar in relation to a second bar portion of the active sway bar to optimize and control body roll accelerations that result from side-to-side road surface irregularities.

In some embodiments, when the driving mode includes rounding the curve of the road, controlling the active roll control motor includes turning a first bar portion of the active sway bar in relation to a second bar portion of the active sway bar to increase the force transmitted and cause the tilt of the vehicle body to lessen with respect to a ground surface.

In some embodiments, determining the desired roll moment based upon the driving mode includes blending a desired roll moment prioritizing ride quality and a desired roll moment prioritizing handling of the vehicle.

In some embodiments, blending the desired roll moment prioritizing the ride quality and the desired roll moment prioritizing the handling of the vehicle is based on a vehicle speed, a vehicle lateral acceleration, and a steering wheel input.

In some embodiments, determining the desired roll moment includes determining a total roll moment for the vehicle body.

In some embodiments, determining the total roll moment for the body includes utilizing a feed forward roll moment determination and a feedback roll moment determination.

DETAILED DESCRIPTION

Figure 1:
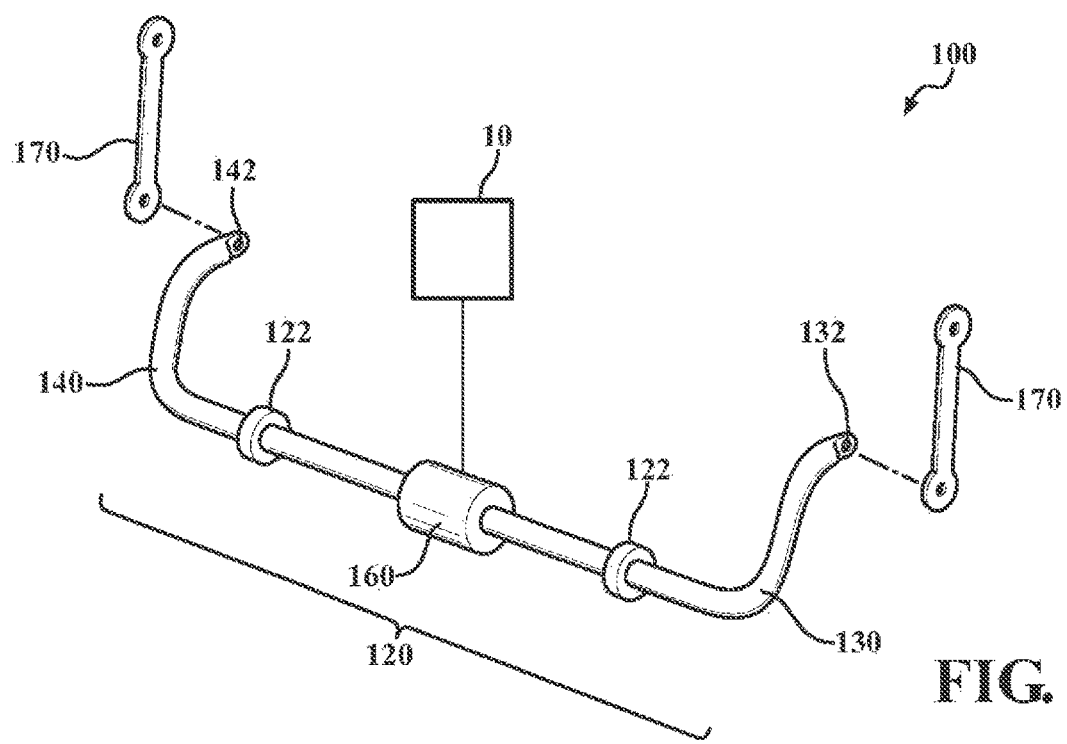
FIG. 1 schematically illustrates portions of an exemplary vehicle suspension system including an adjustable sway bar, in accordance with the present disclosure.

Active roll control is a process by which factors affecting operation of a vehicle suspension system are modified to achieve desired results. These desired results may affect one or both of ride quality, which describes the smoothness of the ride, and handling, which describes vehicle performance, responsiveness, and driving characteristics upon the roadway.

According to one exemplary method, active roll control may be achieved by utilizing one or more active sway bars. A passive sway bar is a bar or torsion spring that connects a left suspension component to a right suspension component. As the one of the suspension components moves relative to a vehicle body, the passive sway bar transmits force from that suspension component to the opposite side suspension component to control how much the vehicle body moves relative to the suspension components and a ground surface. An active sway bar includes a motorized feature connection a first half of the sway bar to a second half of the sway bar, wherein activation of the motorized feature enables a computerized controller to modulate or adjust how much force is transmitted between the opposing suspension components. This adjustment of the active sway bar may be used to control both ride quality and performance of the vehicle. Utilizing active roll bar and a control algorithm, ride quality can be improved without degrading handling performance. A system and method are provided to reduce roll gradient, improve yaw response, and improve ride quality.

The disclosed system and method may utilize an algorithm controlling the roll gradient via feedforward sensor information and/or roll angle feedback. The algorithm improves ride quality using roll motion control. A blending algorithm based on vehicle speed, vehicle lateral acceleration, yaw rate, and steering wheel input may be utilized to merge or balance factors affecting ride quality and performance.

The disclosed system and method may enable use of multiple roll gradients based on selectable driver modes, such as a mode preferring ride quality or a mode preferring improved performance. The disclosed system and method may enable a constant roll gradient independent of suspension design (e.g., air springs static and dynamic rates).

According to one exemplary method, active roll control may include reading vehicle level and component level signals, calculating requested front and rear active sway control motor torques according to processes and methods described herein, and applying active sway control motor torques via the active roll control motors based upon the calculated requested front and rear active sway motor torques.

According to one exemplary system that may be utilized according to the disclosure, such a system may include front and rear active roll control motors, bars that connect the motors to vehicle body and other suspension components, electronic control units (ECU) to implement methods disclosed herein, and sensors to measure several conditions of the vehicle (e.g. roll angle sensor, roll rate sensors, and position/acceleration sensors) in order to implement methods disclosed herein.

FIG. 1 schematically illustrates an exemplary vehicle suspension system including an adjustable sway bar. Vehicle suspension system 100 is illustrated including an active sway bar 120 and a computerized active roll control controller 10. Active sway bar 120 is illustrated including an active roll control motor 160, a first bar portion 140, a second bar portion 130, and vehicle chassis mount bearings or rubber bushings 122. The vehicle chassis mount bearings or rubber bushings 122 may hold each of the first bar portion 140 and the second bar portion 130 in place relative to a vehicle chassis member, permitting the first bar portion 140 and the second bar portion 130 to each rotate with respect to a longitudinal axis of round bar segments held by the vehicle chassis mount bearings or rubber bushings 122, respectively. The active roll control motor 160 may include one or more electric machines configured to control a rotational orientation of the first bar portion 140 to the second bar portion 130. In a neutral or passive position, the active roll control motor 160 may orient the first bar portion 140 and the second bar portion 130 symmetrically, such that a hole 142 in an end of the first bar portion 140 and a hole 132 in an end of the second bar portion 130 may be level with each other. The active roll control motor 160 may be energized in a first direction to cause the first bar portion 140 to rotate in a first rotational direction relative to the second bar portion 130, which may result in the hole 142 being higher in vehicle than the hole 132. The active roll control motor 160 may be energized in a second direction to cause the first bar portion 140 to rotate in a second rotational direction relative to the second bar portion 130, which may result in the hole 142 being lower in vehicle than the hole 132. In this way, control of the active roll control motor 160 may be utilized to control torque transmitted through the active sway bar 120 and correspondingly the operation of the vehicle suspension system 100.

The hole 132 and the hole 142 may each attach directly to other vehicle suspension components such as a control arm, knuckle or shock. In the embodiment of FIG. 1, links 170 are illustrated configured to be attached at a first end to the hole 132 and the hole 142, respectively. The links 170 may be attached at a second end to vehicle suspension components such as a control arm or shock.

The computerized active roll control controller 10 is illustrated in electronic communication with the active roll control motor 160.

Figure 2:
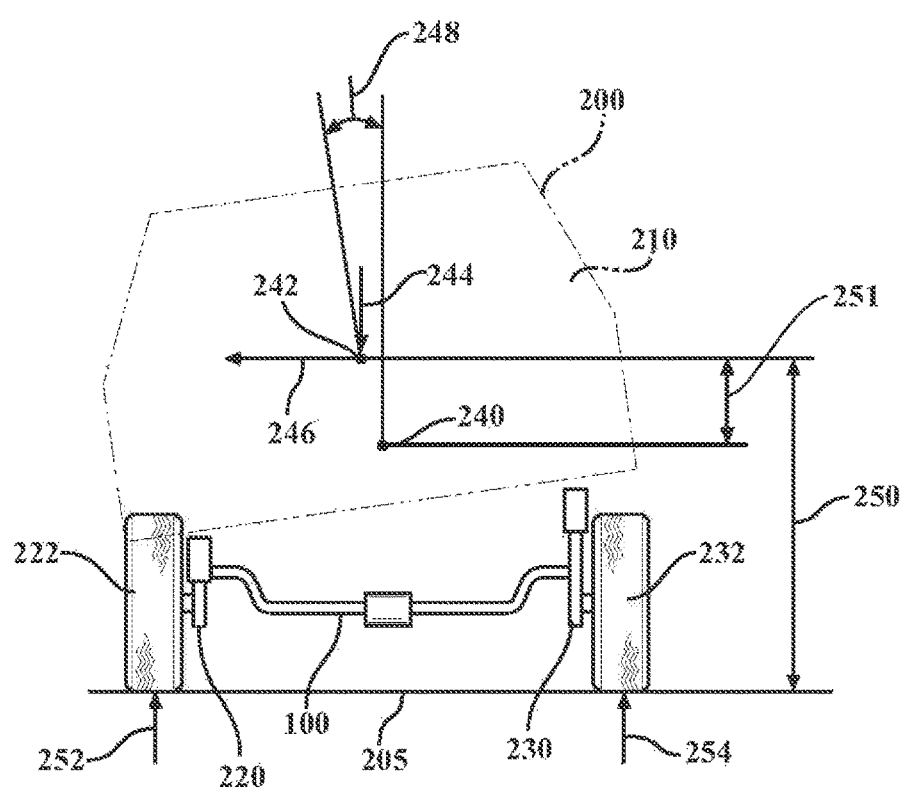
FIG. 2 schematically illustrates an exemplary vehicle body and the vehicle suspension system of FIG. 1, in accordance with the present disclosure.

FIG. 2 schematically illustrates an exemplary vehicle body 210 and major portions of the vehicle suspension system 100 of FIG. 1. Vehicle 200 is illustrated including the vehicle body 210, the major portions of the vehicle suspension system 100, a left wheel 222, and a right wheel 232. The left wheel 222 and the right wheel 232 may be front wheels of the vehicle 200 or rear wheels of the vehicle 200. The left wheel 222 is illustrated attached through suspension components to a left shock device 220, and the right wheel 232 is illustrated attached through suspension components to a right shock device 230. The vehicle body 210 is illustrated tilted at an angle 248 to the left as compared to a ground surface 205. The left wheel 222 and the right wheel 232 are each disposed upon the ground surface 205. The vehicle body 210 is attached to the left shock device 220 and the right shock device 230, such that the tilt in the vehicle body 210 creates a relative compression and shortening of the left shock device 220 as compared to the right shock device 230. A center of gravity 242 of the vehicle body 210 and a roll center 240 for the vehicle body 210 are illustrated.

FIG. 2 illustrates a plurality of forces acting upon the vehicle 200. Force of gravity 244 is illustrated acting upon the center of gravity 242. A lateral force 246 is additionally illustrated acting upon the center of gravity 242. Wheel support force 252 is illustrated acting upwardly upon left wheel 222, and wheel support force 254 is illustrated acting upwardly upon right wheel 232. Additionally, a distance 250 may be defined from the center of gravity to the ground surface 205. Additionally, a distance between a center of left wheel 222 and a center of right wheel 232 may be defined. The disclosed method and system may estimate the distance 251 between center of gravity and roll center, based on the active roll control signals. This corrected distance 251 may be used to make future iterations of the active roll control signals more accurate, for example, by correcting a total roll moment calculation.

Figure 3:
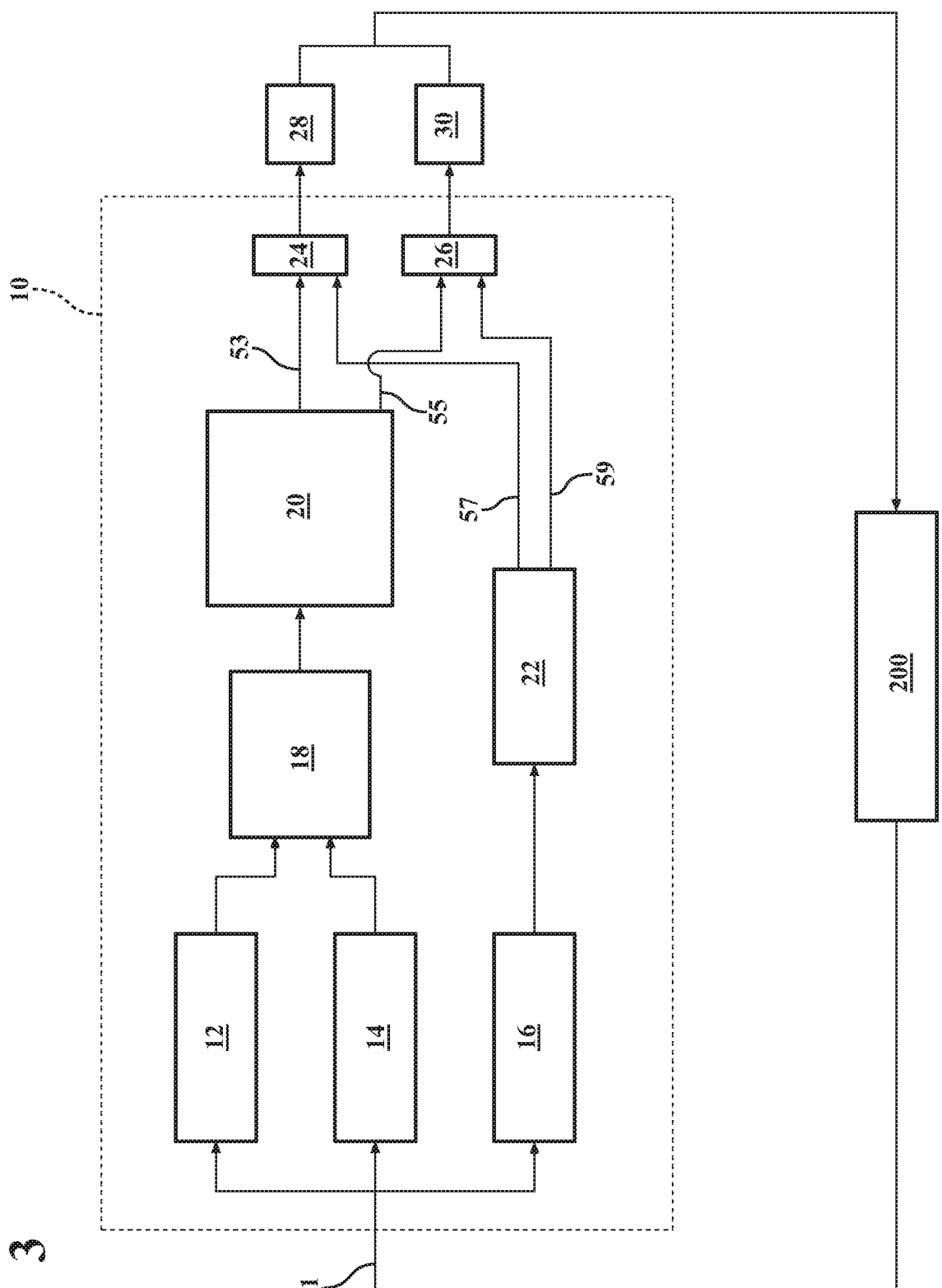
FIG. 3 schematically illustrates an exemplary computerized active roll control controller, in accordance with the present disclosure.

FIG. 3 schematically illustrates an exemplary computerized active roll control controller 10. A plurality of inputs 51 may be measured and provided to the computerized active roll control controller 10. The inputs 51 may include steering wheel angle, steering wheel velocity, yaw rate, lateral acceleration, brake activation signals, a roll angle sensor, a wheel center height (which may be described as a corner trim height, the vertical distance between the wheel center and a point on the body), a vehicle speed, an acceleration sensor output, a driver mode (sport, ride quality, towing, etc.), and trim height or the height of the vehicle body maintained over the vehicle suspension system. The inputs 51 are provided to each of a roll stiffness control module 12, a ride quality enhancement module 14, and a dynamic tire lateral load transfer distribution (TLLTD) module 16. The roll stiffness control module 12 includes programming to determine a desired roll moment of the vehicle body favoring vehicle handling/performance output based upon the inputs 51. The ride quality enhancement module 14 includes programming to determine a desired roll moment of the vehicle body favoring ride quality output based upon the inputs 51. A blending function module 18 monitors the desired roll moment outputs generated by the roll stiffness control module 12 and the ride quality enhancement module 14 and includes programming to selectively blend the two desired roll moments based upon a driving mode of the vehicle. In one embodiment, a driving mode may include a determination whether the vehicle is straight-line driving on a straight road or turning or rounding a curve of a road.

Different stiffness in the vehicle suspension may be desired based upon a different vehicle driving mode. In a driving mode including straight-line driving, demand by the passengers for handling/performance may be low, with no need to quickly turn the vehicle. In that straight-line driving mode, force transmitted along the active sway bar may be constantly adjusted to optimize and control body roll accelerations that are driven by side-to-side road surface irregularities to cushion bumpiness of the ride and increase ride quality. Optimizing and controlling body roll accelerations may include different control functions in different situations. In one example, body roll acceleration may be minimized to provide a smoother ride. In another example, body roll acceleration may be controlled to provide additionally body roll, for example, to achieve desirable vehicle handling characteristics. In a rounding a curve in the road driving mode, handling or performance of the vehicle is a primary factor to maintain proper control over the vehicle through the curve. Similarly, a ride quality of the vehicle may be less primary when the vehicle is rounding a curve. Prioritizing handling of the vehicle may include decreasing or lessening a tilt or roll of the vehicle through the curve which may be achieved by increasing a force transmitted along the active sway bar.

Decreasing or lessening a force transmitted along an active sway bar may include controlling an active roll control motor to twist two portions of an active sway bar in a direction that permits the body to exhibit a greater tilt in relation to a ground surface. Increasing a force transmitted along an active sway bar may include controlling the active roll control motor to twist the two portions of the active sway bar in a direction that causes the body to exhibit a lessor tilt up to including a negative roll angle as seen on motorcycles in relation to a ground surface.

The blending function module 18 provides a blended roll moment output which is provided to a steady-state TLLTD: front and rear distribution module 20 which determines a blended front roll moment output 53 and a blended rear roll moment output 55.

The dynamic TLLTD module 16 includes programming to determine a damping roll moment output, which is provided to a dynamic TLLTD: front and rear distribution module 22. The dynamic TLLTD: front and rear distribution module 22 provides a transient front roll moment output 57 and a transient rear roll moment output 59. A summation module 24 uses a sum of the blended front roll moment output 53 and the transient front roll moment output 57 to generate a requested front roll moment output, which is provided to a front actuator dynamics controller 28. A summation module 26 uses a sum of the blended rear roll moment output 55 and the transient rear roll moment output 59 to generate a requested rear roll moment output, which is provided to a rear actuator dynamics controller 30. The front actuator dynamics controller 28 and the rear actuator dynamics controller 30 provide for control over a front vehicle suspension and a rear vehicle suspension, respectively, including control over at least one active roll control motor of an active sway bar. Dynamics of vehicle 200 are affected by the control of the front vehicle suspension and the rear vehicle suspension, and various parameters related to those dynamics may be monitored and provides as inputs 51.

The computerized active roll control controller 10 may include a computerized processing device, a communications device operable to transmit and receive data through a communications circuit such as a vehicle data bus, an input/output coordination device, and a memory storage device. The processing device may include memory, e.g., read only memory (ROM) and random-access memory (RAM), storing processor-executable instructions and one or more processors that execute the processor-executable instructions. In embodiments where the processing device includes two or more processors, the processors may operate in a parallel or distributed manner. The processing device may execute the operating system of the computerized active roll control controller 10. The processing device may include one or more modules executing programmed code or computerized processes or methods including executable steps in accordance with the disclosed systems and methods. Illustrated modules may include a single physical device or functionality spanning multiple physical devices.

Adjustments to the active sway bar may be described as an adjustment to a sway bar moment. A desired or total body roll moment may be used to determine a desired sway bar moment. In one embodiment, a total body roll moment may be used to refer to a reference table which may supply a corresponding desired roll moment useful to control one or more active roll control motors.

Figure 4:
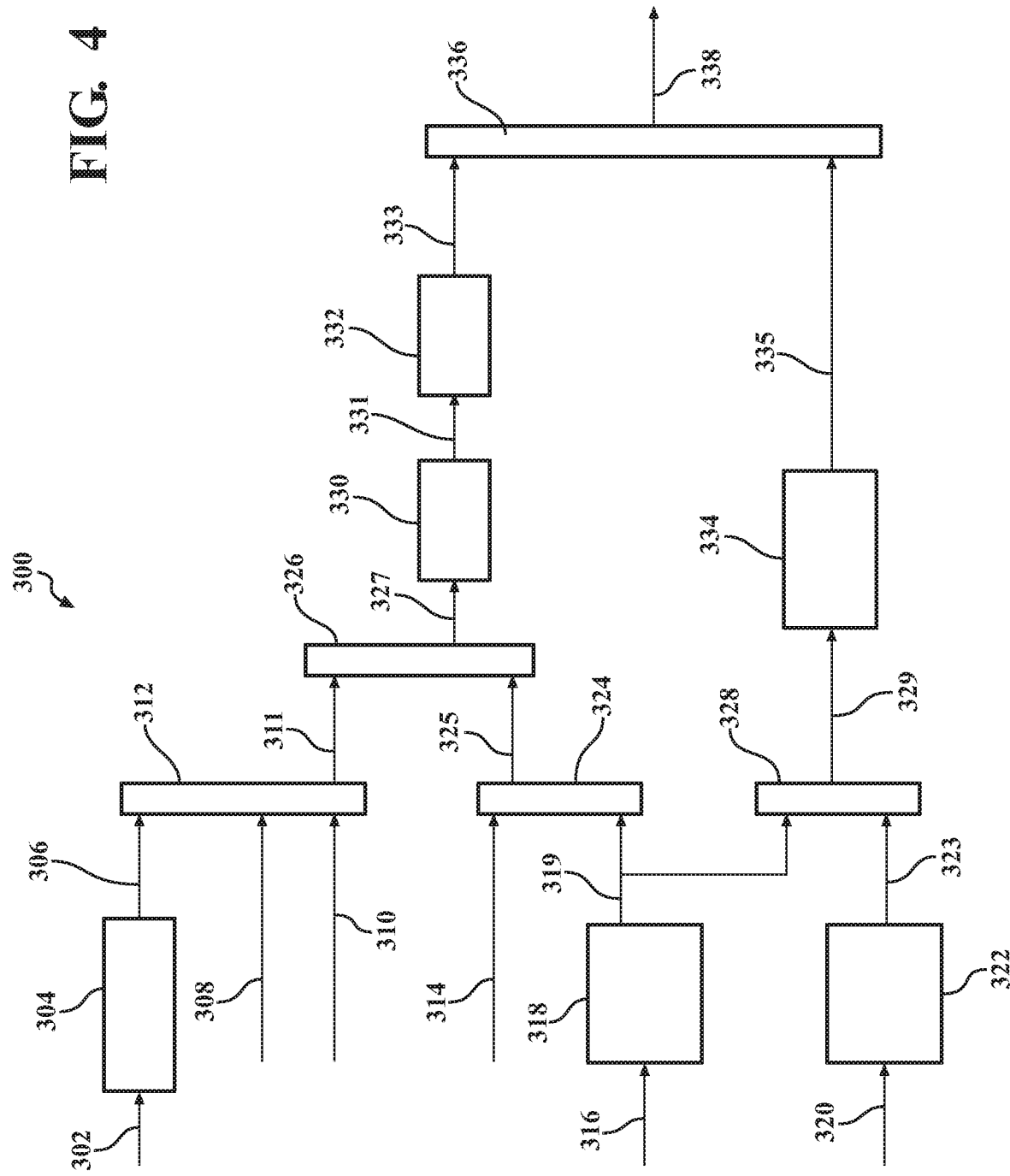
FIG. 4 illustrates an exemplary data flow within the computerized active roll control controller of FIG. 3 to accomplish active roll control, in accordance with the present disclosure.

FIG. 4 illustrates an exemplary data flow 300 within the computerized active roll control controller of FIG. 3, in particular, within the roll stiffness control module 12, to accomplish active roll control. Data flow 300 determines a desired or total roll moment for the vehicle which may be used to determine a desired sway bar moment which may be controlled through an active roll control motor. A lateral acceleration calculation based upon steering inputs and lateral acceleration sensor module 304 is provided with inputs 302 which may include steering wheel angle, steering wheel velocity, yaw rate, lateral acceleration, and vehicle speed and generates a lateral acceleration output 306. A multiplication block 312 inputs the lateral acceleration output 306, a sprung mass value 308, and a distance between a center of gravity of the vehicle body and a roll center of the vehicle body 310. The roll center changes with the trim height or wheel center location, typically it moves twice as fast. Calculating this effect may be captured in the control algorithm through a look up table or similar device. The sprung mass value 308 may be calibrated or adaptively changed based upon an estimated value. The distance between the center of gravity of the vehicle body and the roll center of the vehicle body 310 may be calibrated or adaptively changed based upon an estimated value. The multiplication block 312 provides an output 311.

A desired roll angle calculation module 318 is provided with inputs 316 which may include steering wheel angle, steering wheel velocity, yaw rate, lateral acceleration, vehicle speed, and brake signals. The desired roll angle calculation module 318 provides a desired roll angle output 319. A multiplication block 324 inputs the desired roll angle output 319 and a spring roll rate 314 provided from a look-up table and provides an output 325. A summation block 326 is provided output 311 and a negative value of the output 325 and provides an output 327. The output 327 is provided to low-pass filter block 330 which provides an output 331. The output 331 is provided to an adaptive gain block 332 which provides a feed forward roll moment output 333.

A roll angle determination module 322 is provided that estimates or calculates a roll angle based upon an input 320. The input 320 may include a roll angle sensor output, a position sensor output, and an acceleration sensor output. The roll angle determination module 322 provides a roll angle output 323. A summation block 328 is provided the desired roll angle output 319 and a negative value of the roll angle output 323 and provides an output 329. A feedback controller 334 is provided the output 329 and applies an algorithm, for example, proportional-integral-derivative (PID) control, to generate a feedback roll moment output 335. The feed forward roll moment output 333 and the feedback roll moment output 335 are provided to a summation block 336, which provides a total roll moment output 338. The total roll moment output 338 illustrates an exemplary output of the roll stiffness control module 12 of FIG. 3.

The design in FIG. 4 is based on the roll dynamics of a vehicle, which can be described by the following equation:

$$I_x\ddot{\varphi} - mha_y = -C_t\dot{\varphi} - K^*_t\varphi + mgh\varphi - M_{ARC} \quad (1)$$

where $\varphi$ is vehicle roll angle, $\dot{\varphi}$ is vehicle roll velocity, $\ddot{\varphi}$ is vehicle roll acceleration, $K^*_t$ is roll stiffness without active roll control, m is vehicle mass, g is gravity constant, h is the distance between center of gravity and roll center, $I_x$ is roll moment of inertia, $C_t$ is roll damping coefficient, $M_{ARC}$ is the roll moment applied by active roll control algorithm. During steady-state cornering, the above equation is reduced to the following one as roll velocity and roll acceleration are zero in steady state.

$$M_{ARC} + K^*_t\varphi = mha_y + mgh\varphi \quad (2)$$

Hence we can calculate h as $$h = \frac{M_{ARC} + K^*_t\varphi}{ma_y + mg\varphi} \quad (3)$$

Equation (2) describes how roll moment balances during steady-state cornering. $M_{ARC}$ is known from active roll control algorithm and $K^*_t\varphi$ is the roll moment from other components in suspension, e.g. air spring or coil spring. Here $K^*_t\varphi$ indicates the roll moment is from a spring with known spring constant $K^*_t$. In some systems, the roll moment from other component may be described by a look-up table or a nonlinear function of different signals such as air spring pressure or position sensors in suspension signals. m can be calculated by several methods, e.g. air spring models or a mass estimation algorithm. $\alpha_y$ is lateral acceleration, which can be obtained from sensors. $\varphi$ is directly measurable or calculated from sensors. Similar calculation of h can be done if roll moment from other suspension components is described differently by following the idea described here. In addition, when roll velocity and roll acceleration are not zero during transient cornering, we can design a Kalman filter or apply other estimation algorithms to equation (1) to estimate h, which is the distance between center of gravity and roll center. The estimated distance between center of gravity and roll center can be provided to roll over mitigation system and improve vehicle stability.

Figure 5:
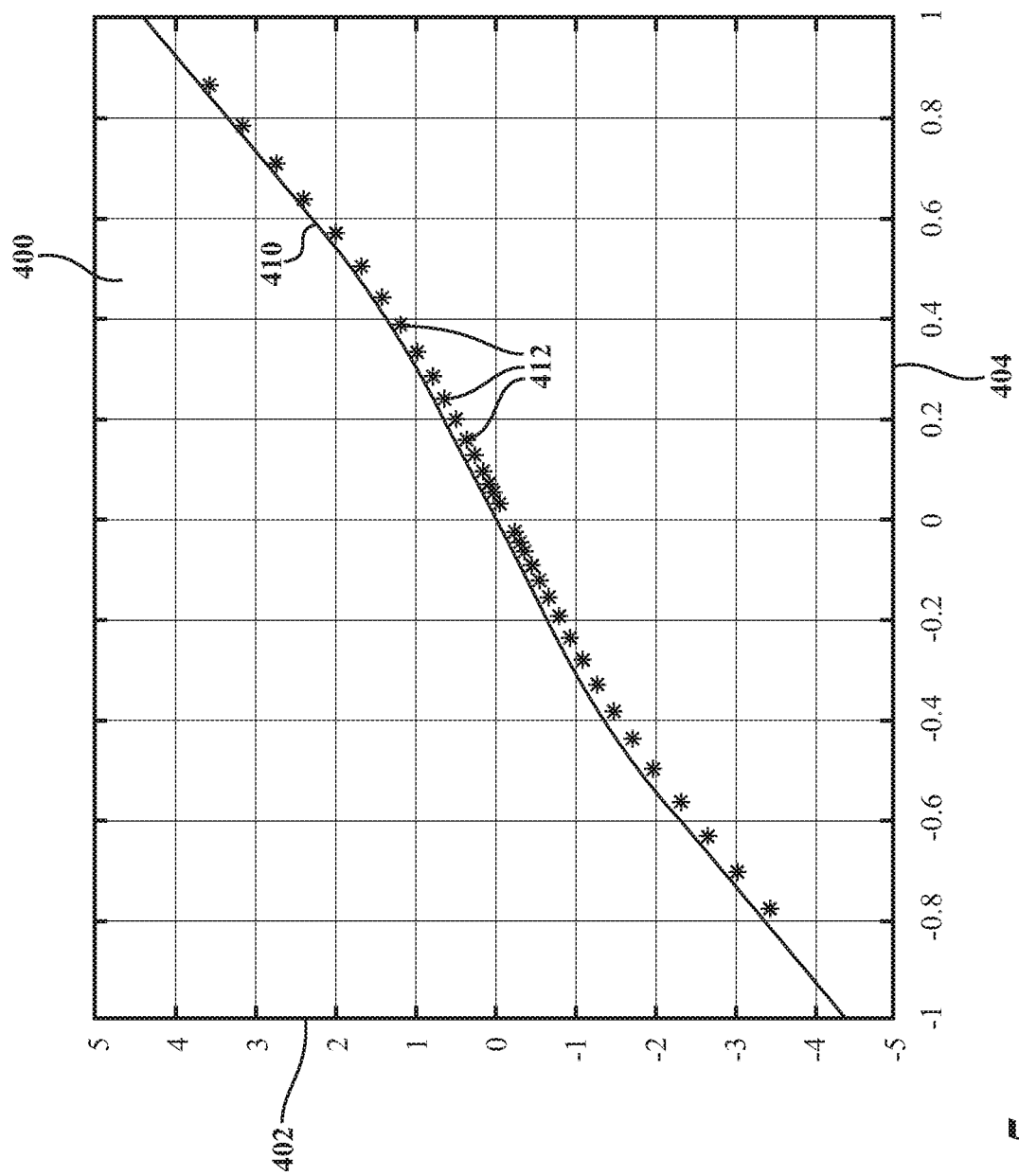
FIG. 5 graphically illustrates roll gradient test results measured as a roll angle as a function of lateral acceleration of the vehicle, in accordance with the present disclosure.

FIG. 5 graphically illustrates roll gradient test results illustrated as roll angle as a function of lateral acceleration of the vehicle. Roll gradient may be described as the derivative of roll angle with respect to lateral acceleration or as the change in roll angle as lateral acceleration changes. Graph 400 is provided illustrating roll angle as a function of vehicle lateral acceleration. A vertical axis 402 is provided to represent roll angle of a vehicle body in degrees. A horizontal axis 404 is provided to represent vehicle lateral acceleration in units of gravity. The solid line 410 illustrates a target or desired curve, approximating a nearly straight diagonal line, which would represent a constant value roll gradient. The data points 412 illustrate actual values achieved in testing with the disclosed system and method.

Figure 6:
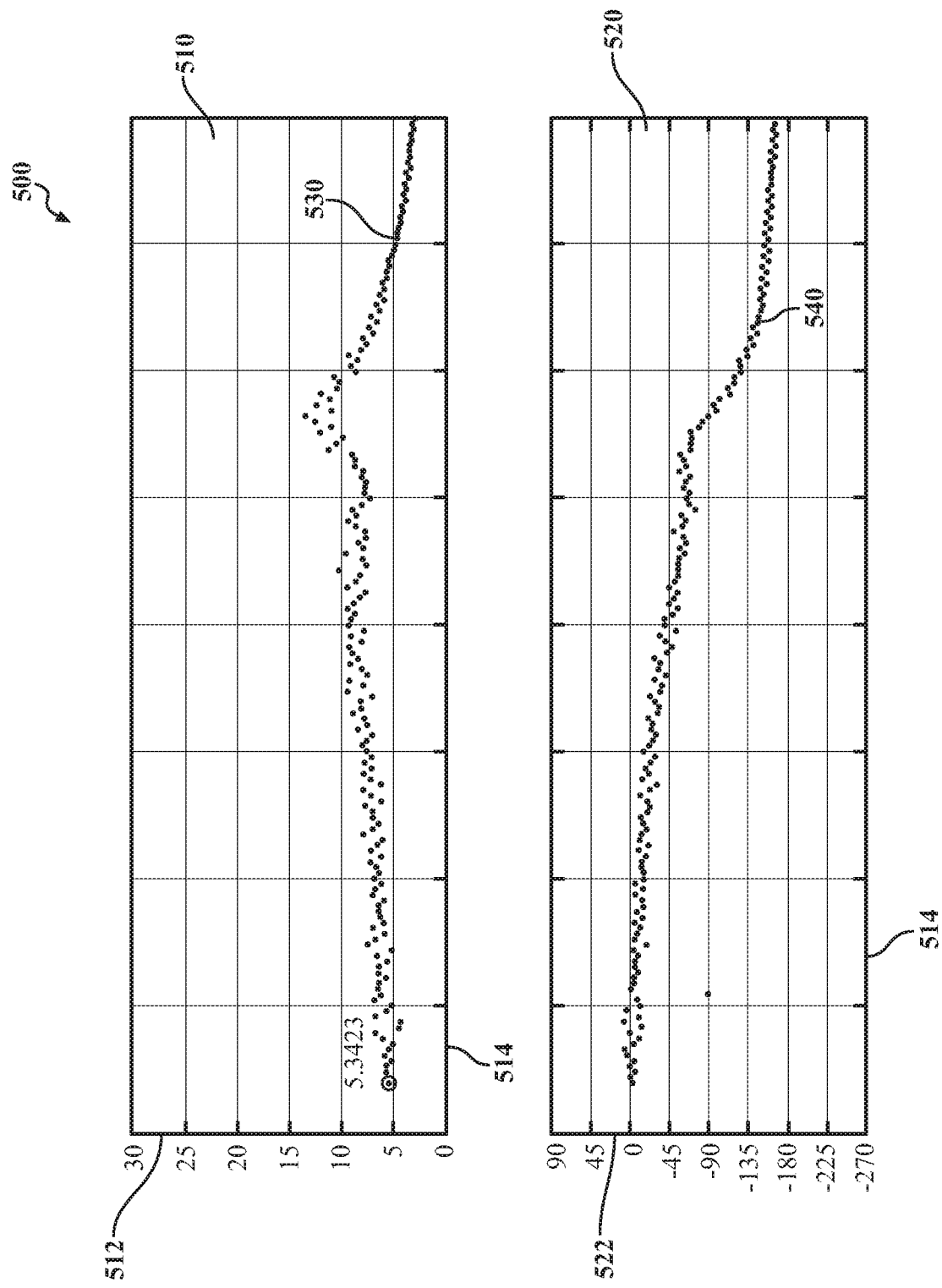
FIG. 6 graphically illustrates roll gain and phase versus vehicle speed, in accordance with the present disclosure.

FIG. 6 graphically illustrates roll gain and phase versus hand wheel speed as a function of a constant steering angle wheel excitation varying hand wheel frequency. Graph 500 is provided illustrating both roll gain as plot 530 in a top portion 510 and roll phase as plot 540 in a bottom portion 520 both as a function of steering wheel frequency. A top vertical axis 512 is provided to represent roll gain in degrees/g. A bottom vertical axis 522 is provided to represent roll phase in degrees. A common horizontal axis 514 is provided to represent steering wheel input frequency in Hz. Active roll control may as disclosed herein may change a shape of roll gain and phase as illustrated in FIG. 6. A flatter response curve indicates a more stable vehicle level response.

Figure 7:
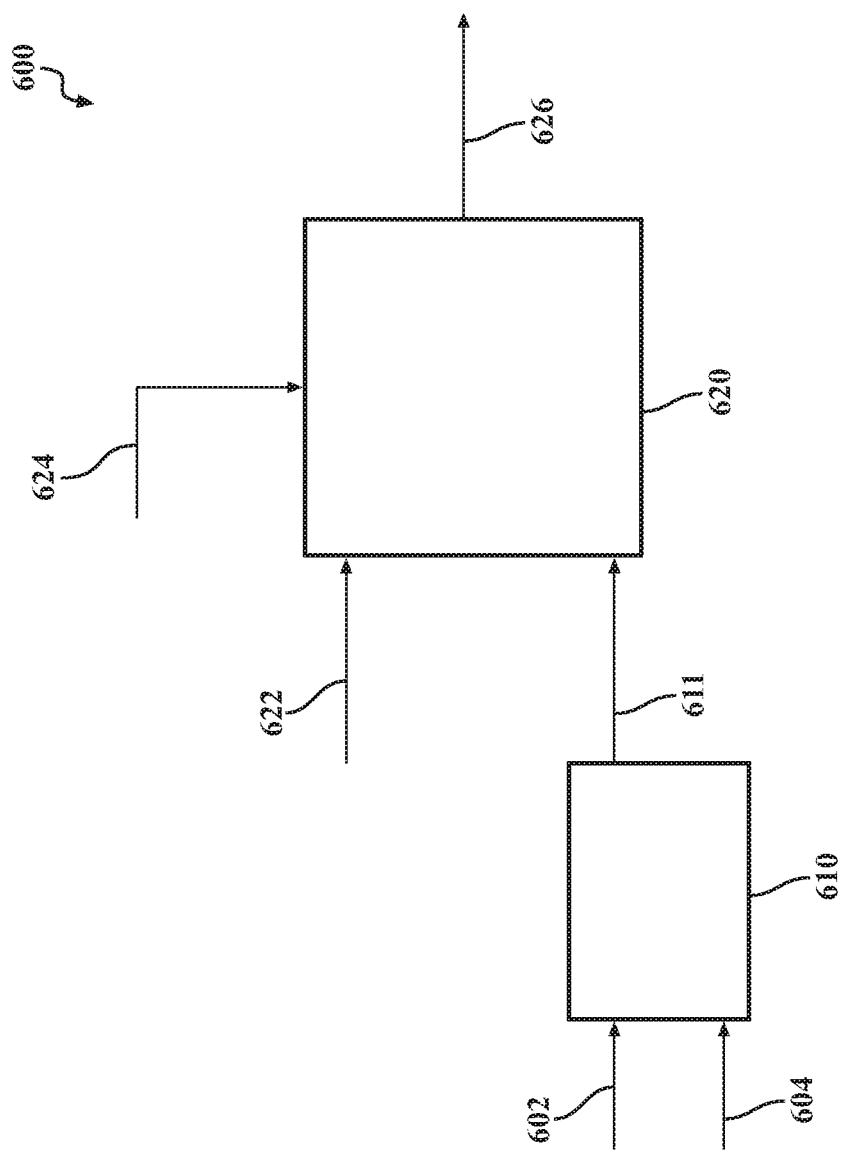
FIG. 7 illustrates an exemplary data flow within the computerized active roll control controller of FIG. 3 to blend performance and ride quality factors in active roll control, in accordance with the present disclosure.

FIG. 7 illustrates an exemplary data flow 600 within the computerized active roll control controller 10 of FIG. 3 to blend performance and ride quality factors in active roll control. A ride quality enhancement module 610 is provided with inputs including a roll angle 602 and a roll velocity 604 and provides a ride quality control command moment output 611. The ride quality control command moment output 611 includes suspension system commands based upon maximizing ride quality. A blending mechanism module 620 is provided inputs including the ride quality control command moment output 611, a roll stiffness control command moment output 622, and an input 624 including steering wheel angle, lateral acceleration, yaw rate, and vehicle speed. In one embodiment, the roll stiffness control command moment output 622 may be the same value or may be provided by the total roll moment output 338 value of FIG. 4. The roll stiffness control command moment output 622 includes suspension system command based upon maximizing vehicle handling/performance characteristics. The blending mechanism module 620 includes programming to utilize the input 624 to blend control commands and provide a desired total roll moment output 626 based upon combining or compromising between the ride quality control command moment output 611 and the roll stiffness control command moment output 622. Under conditions where a smoother ride is desirable, the ride quality control command moment output 611 is prioritized. Under conditions where better handling/performance of the vehicle is desirable, the roll stiffness control command moment output 622 is prioritized.

Methods disclosed herein include algorithms to optimize head toss, for example, utilizing a linear-quadratic regulator (LQR) control algorithm. Such an LQR control algorithm may balance head toss (2-5 Hz), energy consumption, and road isolation (10+Hz) performance. Roll dynamic equations during straight-line driving may be represented by the following Equations 4-6.

$$I_x\ddot{\varphi} = -C_t\dot{\varphi} - K_t\varphi + U(t) + W(t) \quad (4)$$

$$K_t = K^*_t - mgh \quad (5)$$

$$W(t) = \text{disturbance} \quad (6)$$

wherein $\varphi$ is vehicle roll angle, $\dot{\varphi}$ is vehicle roll velocity, $\ddot{\varphi}$ is vehicle roll acceleration, $K^*_t$ is roll stiffness, m is vehicle mass, g is gravity constant, h is the distance between center of gravity and roll center, $I_x$ is roll moment of inertia, $C_t$ is roll damping coefficient, U is the roll moment. W(t) is disturbance to the vehicle roll, as a result of one corner, or multiple corners, hitting road inputs. The roll moment may be provided by the process illustrated in FIG. 7, specifically as the ride quality control command moment output 611. These roll dynamic equations may be transformed to a state space model by the following Equations 7 and 8.

$$\dot{X} = AX + BU + EW \quad X = \begin{bmatrix} \dot{\varphi} \\ \varphi \end{bmatrix} \quad (7)$$

$$A = \begin{bmatrix} -\frac{C_t}{I_x} & -\frac{K_t}{I_x} \\ 1 & 0 \end{bmatrix}, E = \begin{bmatrix} 1 \\ 0 \end{bmatrix}, V = \begin{bmatrix} 1 & 1 \\ 0 & 0 \end{bmatrix} \quad (8)$$

Head toss happens when a car makes a sudden roll motion. On uneven road, roll motions with a large range of frequencies are transmitted from road to the driver or passengers. Human perception or sensitivity about roll motion depends on frequency of the motion. At low frequencies below 1-2 Hz, the head moved with the body. In the frequency range of 2-8 Hz, the amplitude of head acceleration is augmented, indicating that oscillation about a center of rotation low in the body may induce large angular movements in this frequency range because of the linear component of acceleration delivered at the cervical vertebrae. At higher frequencies, the acceleration at the head was attenuated with an associated increase in phase lag, probably due to the absorption of input acceleration by the upper torso.

A filter that converts the roll angle and roll velocity into driver-felt head toss is constructed here in the form of a state space model:

$$\dot{X}_f = A_f X_f + B_f X, \quad (9)$$

where $X_f$ is variables related to driver-felt head toss, $A_f$ and $B_f$ is state and input matrix, which can be calibratable or determined by experiments.

Further, we can combine Equations 7, 8 and 9, and obtain a new state-space model:

$$\dot{X}_c = A_c X_c + B_c U, \quad (10)$$

where $$X_c = \begin{bmatrix} X \\ X_f \end{bmatrix}, A_c = \begin{bmatrix} A & 0 \\ B_f & A_f \end{bmatrix}, B_c = \begin{bmatrix} B \\ 0 \end{bmatrix} \quad (11)$$

An LQR controller can be designed based on (7). Other control methods, e.g. robust and nonlinear controls, can also be applied to balance head toss, energy consumption, and high frequency road noise isolation.

Figure 8:
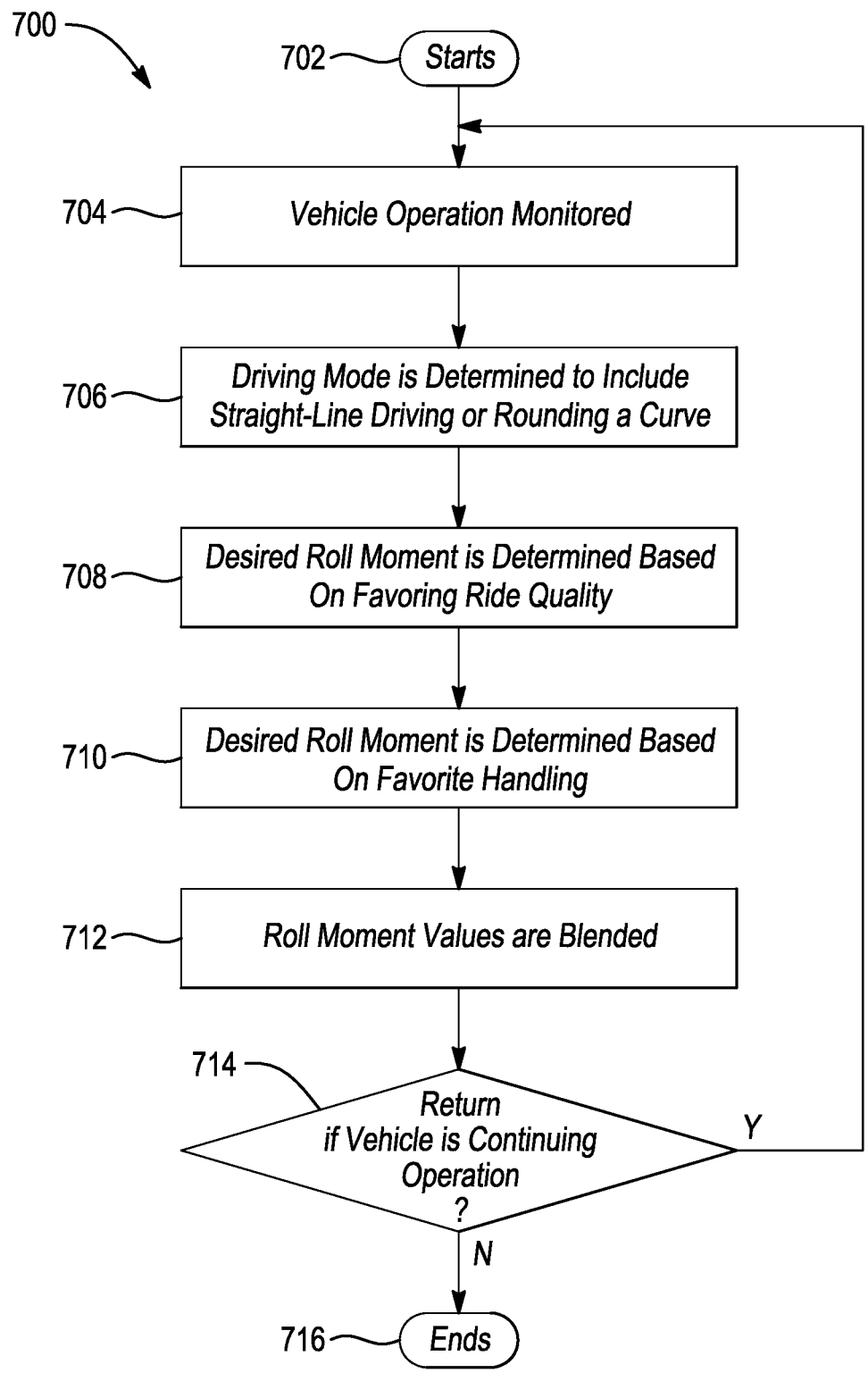
FIG. 8 is a flowchart illustrating an exemplary method for active roll control in a vehicle, in accordance with the present disclosure.

FIG. 8 is a flowchart illustrating an exemplary method 700 for active roll control in a vehicle. Method 700 starts at step 702. At step 704, vehicle operation is monitored including values such as steering angle, steering velocity, yaw rate, lateral acceleration, and brake signals. At step 706, a driving mode is determined to include one of straight-line driving and rounding a curve in a road. At step 708, a desired roll moment is determined based upon favoring ride quality, and that desired roll moment is used to control a suspension system of the vehicle. At step 710, a desired roll moment is determined based upon favoring handling of the vehicle, and that desired roll moment is used to control a suspension system of the vehicle. Steps 708 and 710 may be performed simultaneously. At step 712, in a process illustrated as the blending mechanism module 620 in FIG. 7, the values determined in steps 708 and 710 may be blended. At step 714, a determination is made whether the vehicle is continuing operation. If the vehicle is continuing operation, the method 700 returns to step 704. If the vehicle is not continuing operation, the method 700 advances to step 716 where the method ends. Method 700 is provided as a non-limiting example of how the disclosed systems and method herein may operate. The disclosure is not intended to be limited to the examples provided herein.

While the best modes for carrying out the disclosure have been described in detail, those familiar with the art to which this disclosure relates will recognize various alternative designs and embodiments for practicing the disclosure within the scope of the appended claims.

What is claimed is:

1. A system for active roll control, comprising:
   two wheels including a left wheel and a right wheel;
   a vehicle body of a vehicle;
   a sensor operable to monitor a tilt of the vehicle body;
   a vehicle suspension system operable to support the vehicle body above the two wheels and including:
     an active sway bar operable to transmit a force from a first side of the vehicle suspension system to a second side of the vehicle suspension system in order to provide control over the tilt of the vehicle body, including:
       a first bar portion;
       a second bar portion; and
       an active roll control motor disposed between the first bar portion and the second bar portion, wherein the active roll control motor is operable to turn the first bar portion in relation to the second bar portion; and
   a computerized active roll control controller, operative to:
     monitor a driving mode including one of straight-line driving and rounding a curve on a road;
     monitor an output of the sensor;
     determine a desired roll moment based upon the driving mode and the output of the sensor; and
     control the active roll control motor based upon the desired roll moment,
   wherein, when the driving mode includes the straight-line driving, controlling the active roll control motor includes turning the first bar portion in relation to the second bar portion to adjust body roll accelerations that result from side-to-side road surface irregularities.

2. The system of claim 1, wherein, when the driving mode includes the rounding the curve of the road, controlling the active roll control motor includes turning the first bar portion in relation to the second bar portion to increase a force transmitted along the active sway bar and cause the tilt of the vehicle body to lessen with respect to a ground surface.

3. The system of claim 1, wherein determining the desired roll moment based upon the driving mode includes blending a desired roll moment prioritizing ride quality and a desired roll moment prioritizing handling of the vehicle.

4. The system of claim 3, wherein blending the desired roll moment prioritizing the ride quality and the desired roll moment prioritizing the handling of the vehicle is based on a vehicle speed, a vehicle lateral acceleration, yaw rate, and a steering wheel input.

5. The system of claim 1, wherein determining the desired roll moment includes determining a total roll moment for the vehicle body.

6. The system of claim 5, wherein determining the total roll moment for the vehicle body includes utilizing a feed forward roll moment determination and a feedback roll moment determination.

7. The system of claim 5, wherein the computerized active roll control controller is further operative to estimate a distance between a center of gravity of the vehicle body and a roll center of the vehicle body based upon the desired roll moment; and wherein the distance between the center of gravity of the vehicle body and the roll center of the vehicle body is used to improve a future iteration of determining the total roll moment for the vehicle body.

8. A method for active roll control, comprising:
within with a computerized processor within a vehicle,
monitoring a driving mode including one of straight-line driving and rounding a curve on a road;
monitoring an output of a sensor operable to monitor a tilt of a vehicle body of the vehicle;
determining a desired roll moment based upon the driving mode and the output of the sensor; and
controlling an active roll control motor of an active sway bar of a vehicle suspension system based upon the desired roll moment;
wherein the active sway bar is operable to transmit a force from a first side of the vehicle suspension system to a second side of the vehicle suspension system in order to provide control over the tilt of the vehicle body, and
wherein, when the driving mode includes the straight-line driving, controlling the active roll control motor includes turning a first bar portion of the active sway bar in relation to a second bar portion of the active sway bar to control body roll accelerations that result from side-to-side road surface irregularities.

9. The method of claim 8, wherein, when the driving mode includes the rounding the curve of the road, controlling the active roll control motor includes turning a first bar portion of the active sway bar in relation to a second bar portion of the active sway bar to increase a force transmitted along the sway bar and cause the tilt of the vehicle body to lessen with respect to a ground surface.

10. The method of claim 8, wherein determining the desired roll moment based upon the driving mode includes blending a desired roll moment prioritizing ride quality and a desired roll moment prioritizing handling of the vehicle.

11. The method of claim 10, wherein blending the desired roll moment prioritizing the ride quality and the desired roll moment prioritizing the handling of the vehicle is based on a vehicle speed, a vehicle lateral acceleration, yaw rate, and a steering wheel input.

12. The method of claim 11, wherein determining the desired roll moment includes determining a total roll moment for the vehicle body.

* * * * *